July 14, 1942.                F. E. BRADSHAW                2,289,823
                         METHOD OF MAKING ARCHES
                         Filed April 24, 1941           4 Sheets-Sheet 1
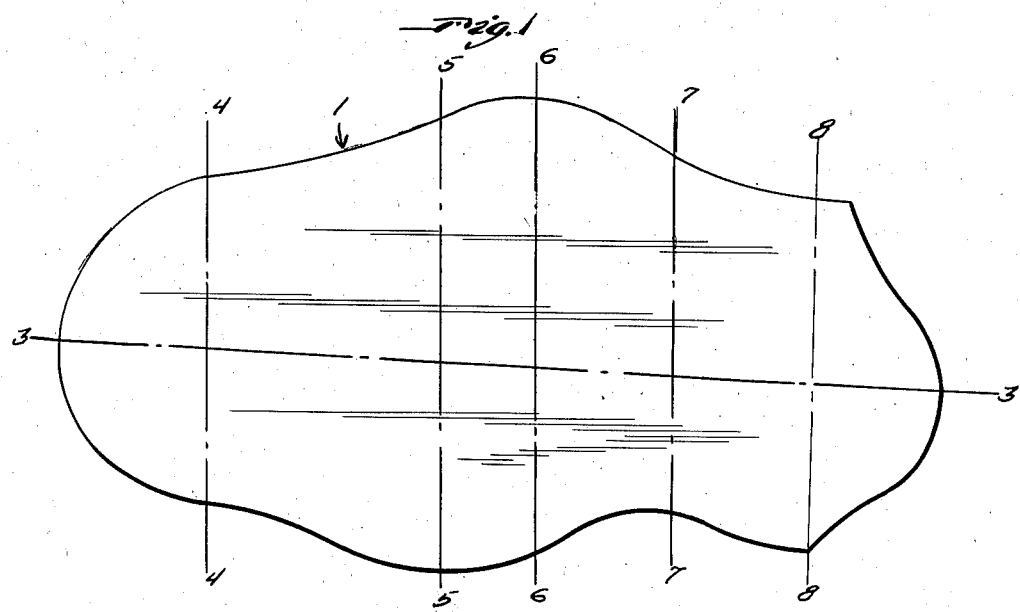
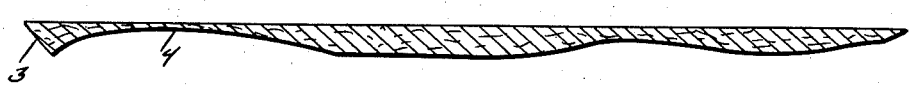
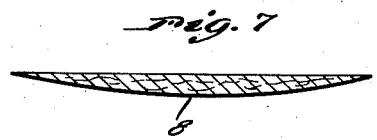
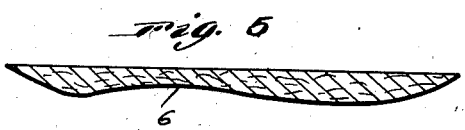
Inventor
Finis E. Bradshaw
By Clarence A. O'Brien
Attorney

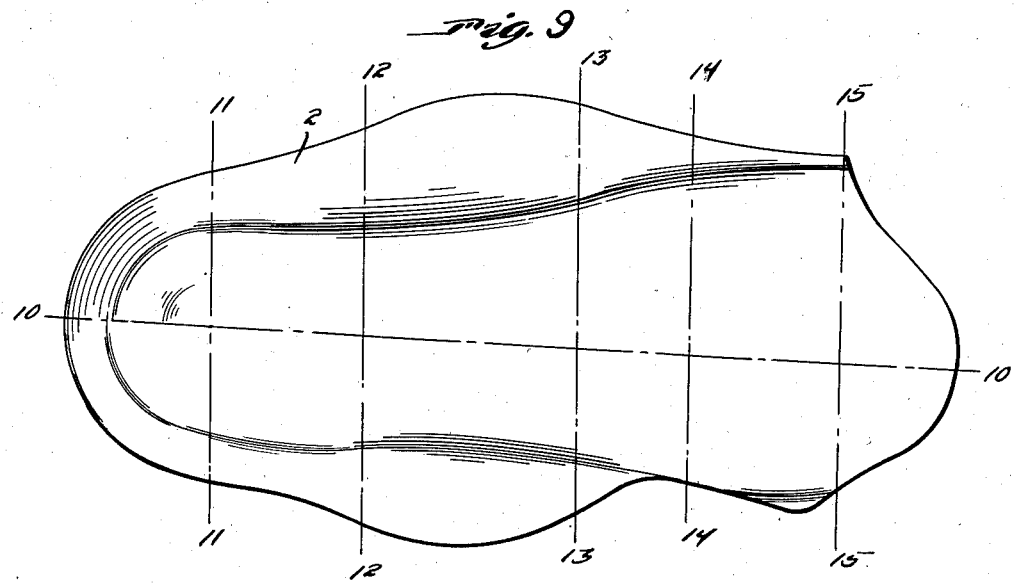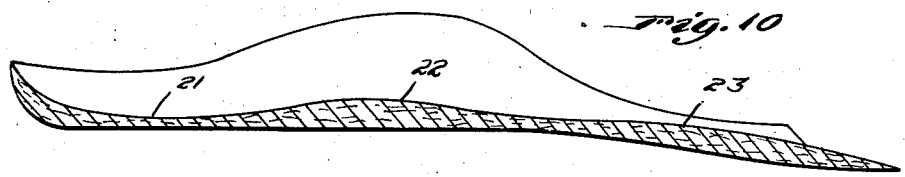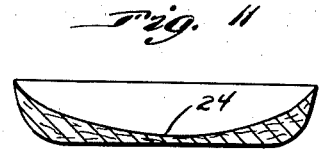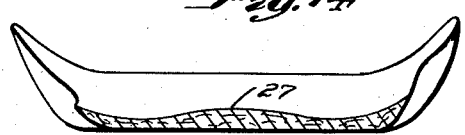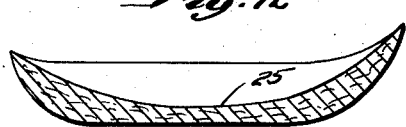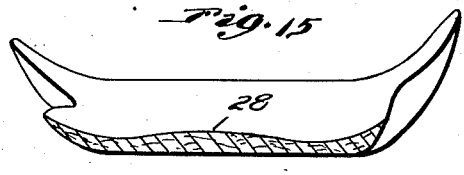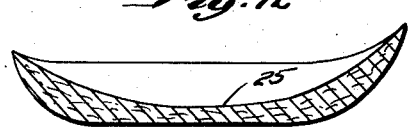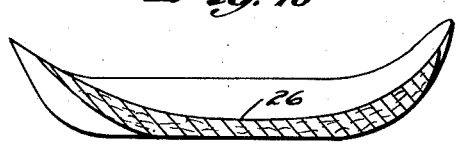

July 14, 1942.  F. E. BRADSHAW  2,289,823
METHOD OF MAKING ARCHES
Filed April 24, 1941   4 Sheets-Sheet 3

Inventor
Finis E. Bradshaw

By Clarence A. O'Brien
Attorney

July 14, 1942.                F. E. BRADSHAW                2,289,823
                         METHOD OF MAKING ARCHES
                         Filed April 24, 1941      4 Sheets-Sheet 4
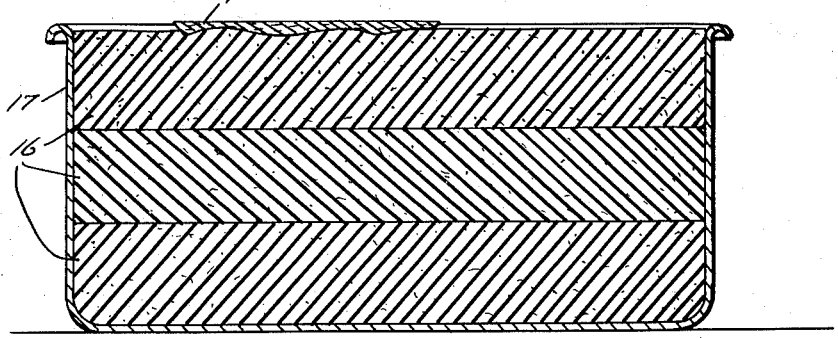
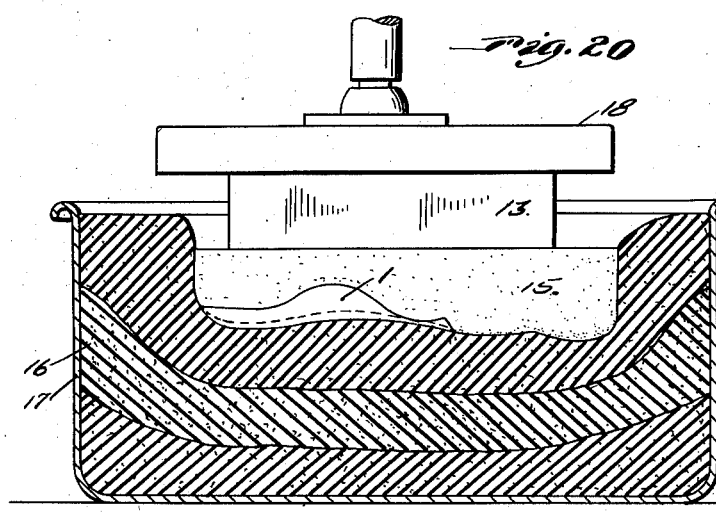
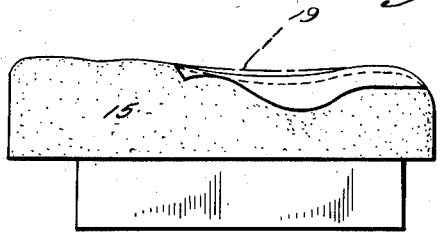
Inventor
Finis E. Bradshaw
By Clarence A. O'Brien
Attorney Patented July 14, 1942

2,289,823

UNITED STATES PATENT OFFICE 2,289,823

METHOD OF MAKING ARCHES

Finis E. Bradshaw, Temple, Tex.

Application April 24, 1941, Serial No. 390,186

2 Claims. (Cl. 12—146)

My invention relates to improvements in methods of making arch supports for the feet, the primary object in view being to provide a method of making such devices whereby the cuboid portion of the foot, as well as the longitudinal and entire metatarsal arch region is properly supported and absolutely accurate fitting is obtained.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a view in top plan of the blank from which my improved arch is made.

Figure 2 is a view in side elevation.

Figure 3 is a view in longitudinal section taken on the line 3—3 of Figure 1.

Figure 4 is a view in transverse section taken on the line 4—4 of Figure 1.

Figure 5 is a similar view taken on the line 5—5 of Figure 1.

Figure 6 is a similar view taken on the line 6—6 of Figure 1.

Figure 7 is another similar view taken on the line 7—7.

Figure 8 is another similar view taken on the line 8—8.

Figure 9 is a view in top plan of the finished arch or brace.

Figure 10 is a view in longitudinal section taken on the line 10—10 of Figure 9.

Figure 11 is a transverse section taken on the line 11—11 of Figure 9.

Figure 12 is a similar view taken on the line 12—12 of Figure 9.

Figure 13 is another similar view taken on the line 13—13 of Figure 9.

Figure 14 is another similar view taken on the line 14—14 of Figure 9.

Figure 15 is another similar view taken on the line 15—15 of Figure 9.

Figure 19 is a view in transverse section illustrating the manner in which the arch is molded.

Figure 20 is a similar view illustrating pressure being applied in the molding.

Figure 21 is a view in side elevation illustrating the arch or brace having the filler applied thereto.

Reference being had to the drawings by numerals, according to my invention, a blank 1 for forming the support is cut from saddle leather of the approximate size of the foot to be fitted, to support the heel, longitudinal arch, and metatarsal arch and to provide an edge flange 2 around the sides and heel of the support. The blank is cut from sheet leather approximately one-quarter of an inch thick throughout. Blanks are cut in assorted sizes for different sizes of feet as will be understood. The edges of the blank 1 are then skived to provide an undercut marginal bevel 3 around the same.

The blank 1 is then cut and skived on its bottom face throughout the heel portion, or the area to underlie the calcaneum bone, to concave the same both longitudinally and transversely as shown at 4, 5, in Figures 3 and 4, respectively.

Forwardly of the heel or calcaneum supporting portion the blank 1 is skived or cut on its bottom from rear to front throughout successive portions designed to support the four tarsal bones, i. e., the cuboid, external, middle, and interior cuneiform, to vary the thickness of the blank transversely and longitudinally. For instance, as shown in Figure 5, the blank is concaved, as at 6, adjacent the outer edge of the blank to reduce its thickness under the cuboid supporting portion, similarly concaved, as shown in Figure 6, at 7 further inwardly under the external cuneiform supporting portion, and reduced in thickness, convexed transversely as shown in Figures 7 and 8, and feathered to the edge of the blank throughout the middle cuneiform supporting area, and convexed in greater degree, as shown in Figure 8, at 9, throughout the interior cuneiform supporting area. As will presently more clearly appear, by varying the thickness throughout the blank 1 in the manner described, the blank may be expeditiously molded to foot form and proper heel and arch supporting contours.

Figure 16:
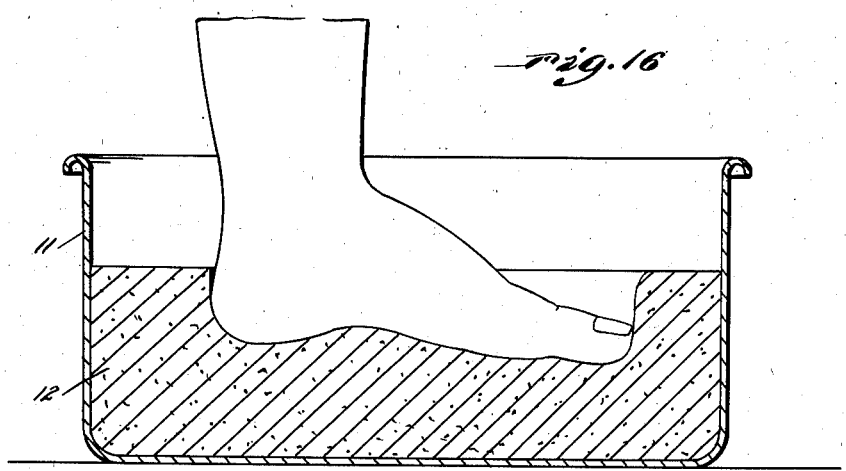
Figure 16 is a view in transverse section illustrating the manner in which the impression of the foot is taken.
Figure 17:
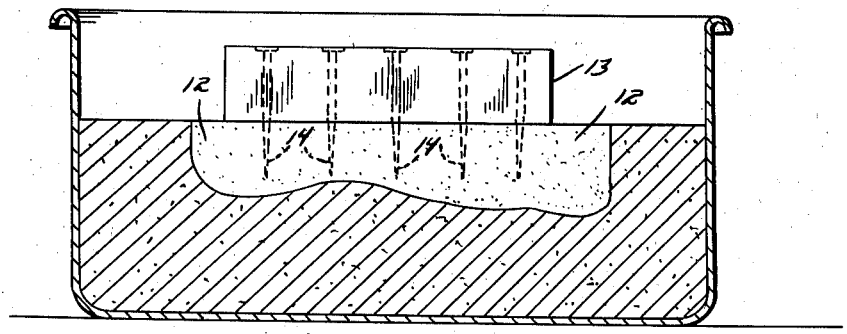
Figure 17 is a similar view illustrating the manner in which the plaster cast is formed.
Figure 18:
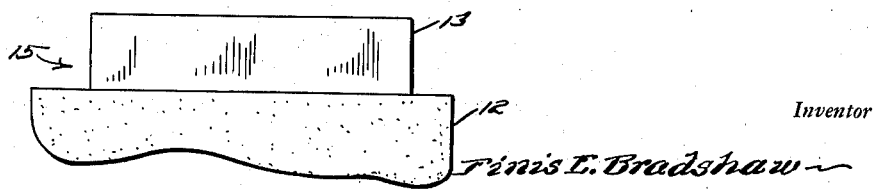
Figure 18 is a view in elevation of the plaster cast.

Preparatory to molding the blank 1, an impression of the foot to be fitted is first taken, as illustrated in Figure 16, in putty or modeling clay 10 placed in a suitable pan 11 and soft enough to allow the foot to be pressed well therein but stiff enough to hold the impression.

From the impression thus made a cast is prepared, preferably of plaster Paris, 12, poured into the impression flush with the top of the molding material. The plaster of Paris may be reinforced by strips 13 of any suitable material laid lengthwise thereof and nails 14 therein penetrating the plaster. After the cast 15 has set it is removed and the modeling material may be smoothed down for another fitting and covered to be kept dry.

The blank 1 prepared, as previously explained, is next molded as follows:

Said blank 1 is moistened in water or other liquid and disposed bottom down on a cushion base, preferably comprising thick layers of sponge rubber 16 fitted in a pan 17. Next the cast 15 is positioned on the blank 1 so that the border edges of the blank are free to be formed into the described flange 2 around the cast. Pressure is then applied to the cast 15, as shown in Figure 19, by any suitable press, represented at 18, until the molded blank 1 is dry.

After molding, the bottom of the molded blank 1 is turned bottom up on the cast 15 and marked off, in any suitable manner to indicate the contour of the insole under the longitudinal arch, and a suitable filler 19, preferably, though not necessarily, of liquid rubber, or the like, is applied in the zone defined by the marked contour so that the bottom of the support, after the filler hardens, fits the shoe snugly.

As will now be seen, by reducing the thickness of the blank 1 and molding in the manner described, the top face of the blank is easily and accurately formed to support the foot and brace the same properly. For instance, as shown in Figure 10, the support is formed longitudinally with concave contour beneath the heel, as at 21, upwardly, convex contour, as at 22, under the longitudinal arch and instep, and convex contour, as at 23, under the matatarsal arch. Transversely, the support is concaved under the heel and instep, as at 24, 25 in Figures 11 and 12, and convex, as at 26, in Figure 13 directly behind the metatarsal arch, also convex as at 27, 28 in Figures 14, 15, under the metatarsal arch region. By beveling the edge of the blank 1, the flange 2 is readily formed in molding and with a feathered edge.

By the practice of the described method feet of all types and descriptions may be accurately fitted with arches particularly abnormal and deformed feet.

The foregoing will, it is believed, suffice to impart a clear understanding of my invention without further explanation.

Manifestly the invention, as described, is suceptible of modification without departing from the inventive concept and right is herein reserved to such modifications as fall within the scope of the subjoined claims.

What I claim is:

1. The herein described method of forming a blank of leather or the like of uniform thickness into an arch support for a foot comprising skiving the underside of the blank into concave form throughout different areas thereof, taking an impression of the foot, forming a cast from the impression, molding the blank under pressure to conform to the cast, and building up the underside of the molded blank to conform to the contour of a shoe.

2. The herein described method of forming a blank of leather of uniform thickness into an arch support for a foot comprising taking an impression of the foot, molding the blank under yielding pressure to conform to the impression, and building up the underside of the folded blank to conform to the contour of a shoe.

FINIS E. BRADSHAW.